No. 643,287. Patented Feb. 13, 1900.
I. H. HALL, Jr.
CALF FEEDER.
(Application filed Sept. 1, 1899.)
(No Model.)
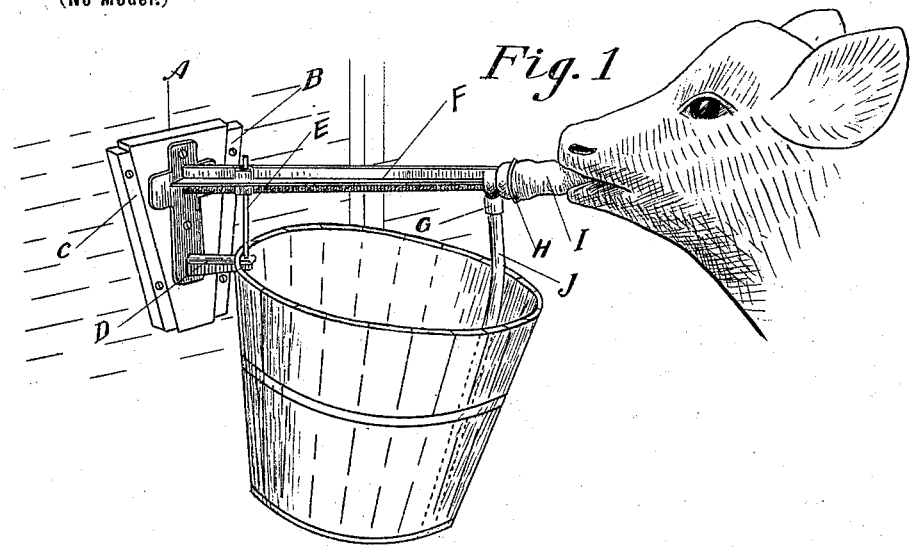
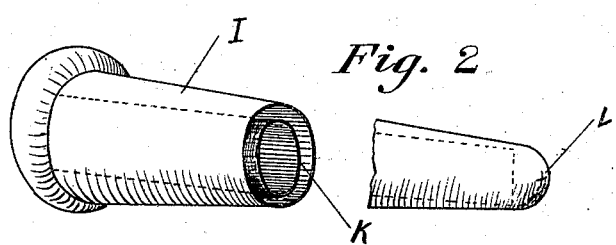
WITNESSES:
INVENTOR
BY
ATTORNEYS.

UNITED STATES PATENT OFFICE.

IPHUS HARVEY HALL, JR., OF LYNDON, VERMONT.

CALF-FEEDER.

SPECIFICATION forming part of Letters Patent No. 643,287, dated February 13, 1900.

Application filed September 1, 1899. Serial No. 729,153. (No model.)

*To all whom it may concern:*

Be it known that I, IPHUS HARVEY HALL, Jr., a citizen of the United States, residing at Lyndon, in the county of Caledonia and State of Vermont, have invented a new and useful Calf-Feeder, of which the following is a specification.

My invention relates to improvements in calf-feeding devices having a flexible nipple in connection with a food-receptacle; and the object of my improvement is to provide a feeding device for calves or other young mammals that is attachable and adjustable to any tub, bucket, pail, trough, or other receptacle suitable for holding liquid food, whereby the animal may obtain its food in a natural manner. I attain this object by the mechanism illustrated in the accompanying drawings, in which—

Figure 1 is a full side view of the device; Fig. 2, the nipple.

Similar letters refer to similar parts throughout.

The metal holder F is the framework of the device. Securely fastened to a dovetail block A is the holder F. Slides B and C are attached to any substantial support, as a post, the side of the building, or any rigid substance. Holder F at its outer end is provided with a rubber nipple with crossed cuts for perforations, as shown at L in Fig. 2, instead of round orifices, this form of perforation acting as a valve to hold the liquid in suspension in the nipple and connected tube. The nipple I is held in place on holder F by band H. On the lower side of holder F and near the nipple I is a boss G, to which is attached tube J, leading to the bottom of the food-receptacle. It will be obvious that holder F has a conduit or duct leading from the nipple I back to and down through boss G to tube J.

The holder F at its inner end, where fastened to dovetail block A, is provided with a lateral lug D, suitable for holding a pail or other food-receptacle. A pin E passes through holder F and rests on lug D. This pin E slides up and down freely in F, so that by raising pin E up the receptacle may be removed. It will be seen that as long as pin E remains down the receptacle is held securely in place.

The feeding device being attached to dovetail block A, can be readily removed, cleaned of all fermenting substances, and stored until another feeding time.

The nipple I has an internal tube K, as shown in dotted lines, Fig. 2, which is not connected to the nipple, but through which all the food comes. It will be seen that this inner tube prevents the nipple from collapsing. The metal holder F, at its outer end, where the nipple I goes on, has a hemispherical knob or head, over which the nipple I is drawn. This knob is somewhat larger than the body of the holder and has a square shoulder on the side toward A, the nipple being forced over this knob. The square shoulder holds it and prevents it from being drawn off.

I am aware that prior to my invention calf-feeders have been made where the food-receptacle was included in the feeding device. I therefore do not claim such invention broadly; but What I do claim as my invention, and desire to secure by Letters Patent, is—

1. In a calf-feeding device the combination of a frame adapted at one end to be attached to a wall, a nipple attached to the other end of said frame, a branch tube attached to said frame and connecting with said nipple, a flexible tube attached to said branch tube, and means for attaching a receptacle to said frame, substantially as set forth.

2. In a calf-feeding device the combination of a dovetail block, a metal plate attached to said block, two arms projecting from said plate at right angles thereto, a flexible tube and nipple adapted to be attached to the end of the longer of said arms, the shorter arm being adapted to support a receptacle, and slides in which said dovetail block fits, adapted to be attached to a wall, substantially as set forth.

3. In a calf-feeding device, the combination of a frame adapted to be attached to a wall, consisting of a flat block provided with two arms projecting at right angles from said block, one above the other, the upper arm being the longer and provided with a nipple and flexible tube attached to its outer end, and a movable pin passing through said upper arm and resting on said lower arm, so as to securely hold any receptacle supported by said lower arm, substantially as set forth.

4. In a calf-feeding device the combination of a frame adapted to be attached to a wall at one end and provided with a terminal, hemispherical knob at the other end, a nipple adapted to fit over said knob, a branch tube attached to said frame and connecting with said nipple, a flexible tube adapted to be attached to said branch tube, and means for attaching a receptacle to said frame, substantially as set forth.

5. In a calf-feeding device the combination of a frame adapted to be attached to a wall at one end, a nipple adapted to be attached to the other end of said frame, consisting of an outer, flexible, tubular casing and a rigid, inner tubular reinforcement and provided with cross-slits in the end of said outer casing so as to form a valve, a branch tube attached to said frame and connecting with said nipple, a flexible tube adapted to be attached to said branch tube, and means for attaching a receptacle to said frame, substantially as set forth.

6. In a calf-feeding device the combination of a frame adapted to be attached to a wall at one end, a nipple and flexible tube attached to the other end of said frame, and means attached to said frame for securely and detachably holding a receptacle, substantially as set forth.

IPHUS HARVEY HALL, Jr.

Witnesses:
ALBERT HOWE,
C. H. JONES.